United States Patent
Kim et al.

(10) Patent No.: US 9,574,707 B2
(45) Date of Patent: Feb. 21, 2017

(54) METHOD FOR MANUFACTURING GAS CYLINDERS

(71) Applicant: NORSTAR COMPOSITE CO., LTD, Seoul (KR)

(72) Inventors: Ki Dong Kim, Seoul (KR); Gi Hun Kwon, Seoul (KR); Chang-Bae Lee, Hwaseong (KR)

(73) Assignee: Norstar Composite Co., Ltd., Seoul (KR)

( * ) Notice: Subject to any disclaimer, the term of this patent is extended or adjusted under 35 U.S.C. 154(b) by 0 days.

(21) Appl. No.: 14/428,845

(22) PCT Filed: Sep. 26, 2012

(86) PCT No.: PCT/KR2012/007773
§ 371 (c)(1),
(2) Date: Mar. 17, 2015

(87) PCT Pub. No.: WO2014/042303
PCT Pub. Date: Mar. 20, 2014

(65) Prior Publication Data
US 2015/0219277 A1    Aug. 6, 2015

(30) Foreign Application Priority Data

Sep. 17, 2012 (KR) .................. 10-2012-0103013

(51) Int. Cl.
*F17C 1/00* (2006.01)
*F17C 1/06* (2006.01)
(Continued)

(52) U.S. Cl.
CPC ............ *F17C 1/06* (2013.01); *B29C 37/0007* (2013.01); *B29C 49/20* (2013.01); *B29C 65/48* (2013.01);
(Continued)

(58) Field of Classification Search
CPC ............ F17C 1/06; F17C 13/025; F17C 1/16; F17C 1/02; F17C 2260/011; F17C 2209/2154; B29C 49/20; B29C 65/48; B29C 65/80; B29C 37/0007; B29C 2049/2017; B29D 22/003; Y10T 29/49764; B29K 2303/04; B29K 2101/00; B29K 2309/08
See application file for complete search history.

(56) References Cited

U.S. PATENT DOCUMENTS 5,535,912 A * 7/1996 Fritz ..................... B29C 70/088
                                                                        220/586
8,453,868 B2 * 6/2013 Cola ......................... F17C 1/06
                                                                        220/586
(Continued)

FOREIGN PATENT DOCUMENTS

JP    08240506 A      9/1996
JP    2009058111 A    3/2009
(Continued)

*Primary Examiner* — Richard Chang
(74) *Attorney, Agent, or Firm* — Sheridan Ross P.C.

(57) ABSTRACT

Disclosed is a method for manufacturing gas cylinders. The disclosed method for manufacturing gas cylinders comprises: a) a step of producing a liner using a liner blower machine; b) a step of applying an adhesive to the threads of the produced liner; c) a step of coupling a bushing to the threads of the liner; d) a step of leaving the liner having undergone step c) for 30 minutes to 2 hours at room temperature so as to naturally harden the adhesive; e) a liner-flaming step of heat-treating the outer surface of the liner with plasma; f) a step of coupling a shaft to the liner; g) a winding step of mixing multiple fiberglass strands with a resin and a hardening agent, and wrapping the mixture around the outer surface of the liner; h) a dry-hardening step of drying the cylinder made of the composite material and having undergone the winding step for 70 to 90 minutes at (Continued)

a temperature of 70° C. to 90° C.; i) a cooling step of leaving the cylinder made of the composite material for 15 to 40 minutes at room temperature so as to lower the surface temperature of the cylinder having undergone the dry-hardening step to a level of 35° C. or lower; j) a step of separating the shaft from the cylinder made of the composite material; k) a step of assembling a valve to the bushing installed in the cylinder made of the composite material; and l) a step of checking the state of the gas cylinder including the cylinder made of the composite material.

1 Claim, 2 Drawing Sheets

(51) Int. Cl.
*F17C 1/02* (2006.01)
*F17C 1/16* (2006.01)
*B29C 37/00* (2006.01)
*B29C 49/20* (2006.01)
*B29C 65/48* (2006.01)
*B29C 65/80* (2006.01)
*B29D 22/00* (2006.01)
*F17C 13/02* (2006.01)
*B29K 101/00* (2006.01)
*B29K 303/04* (2006.01)
*B29K 309/08* (2006.01)

(52) U.S. Cl.
CPC .............. *B29C 65/80* (2013.01); *B29D 22/003* (2013.01); *F17C 1/02* (2013.01); *F17C 1/16* (2013.01); *F17C 13/025* (2013.01); *B29C 2049/2017* (2013.01); *B29K 2101/00* (2013.01); *B29K 2303/04* (2013.01); *B29K 2309/08* (2013.01); *F17C 2201/0109* (2013.01); *F17C 2201/056* (2013.01); *F17C 2201/058* (2013.01); *F17C 2203/012* (2013.01); *F17C 2203/0604* (2013.01); *F17C 2203/0663* (2013.01); *F17C 2209/21* (2013.01); *F17C 2209/2127* (2013.01); *F17C 2209/2154* (2013.01); *F17C 2209/227* (2013.01); *F17C 2209/234* (2013.01); *F17C 2221/011* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/033* (2013.01); *F17C 2223/036* (2013.01); *F17C 2260/011* (2013.01); *Y02E 60/321* (2013.01); *Y10T 29/49764* (2015.01)

(56) References Cited

U.S. PATENT DOCUMENTS 8,474,647 B2 * 7/2013 Vinjamuri ................ F17C 1/02
220/4.12
8,967,417 B2 * 3/2015 Sharp ........................ F17C 1/16
220/203.25

FOREIGN PATENT DOCUMENTS

| JP | 2011102614 A | 5/2011 |
| KR | 1019990085513 A | 6/1999 |
| KR | 1020030041002 A | 5/2003 |
| KR | 1020050039603 A | 4/2005 |
| KR | 1020070099688 A | 9/2007 |

* cited by examiner

METHOD FOR MANUFACTURING GAS CYLINDERS

CROSS REFERENCE TO RELATED APPLICATIONS

This Application is a 35 U.S.C. §371 National Phase Entry Application of International Application No. PCT/KR2012/007773 filed Sep. 26, 2012, which designates the U.S., and which claims benefit under 35 U.S.C. §119(b) and 37 CFR 1.55(a) of Korean Application No. 10-2012-0103013 KR, filed Sep. 17, 2012, the contents of each of which are incorporated herein by reference in their entireties.

TECHNICAL FIELD

The present invention relates to a method for manufacturing gas cylinders, and more particularly, to a method for manufacturing gas cylinders, whereby gas cylinders having high strength can be produced and productivity is improved.

BACKGROUND ART

Gas cylinders are used to store and charge high-pressure gas, such as liquefied petroleum gas (LPG), compressed natural gas (CNG), bio gas, oxygen, or hydrogen. In particular, these gas cylinders need to have sufficient strength so that high-pressure gas can be stored and kept in the gas cylinder for a long time.

A gas cylinder according to the related art is manufactured by producing a resin liner using a liner blower machine and curing the resin liner and then by reinforcing strength by wrapping fiber reinforced plastics (FRP) or fiber around an outer circumference of the resin liner.

However, it is difficult to obtain sufficient strength at which the liner can withstand various high-pressure gases, only by reinforcing the thickness of the liner by manually wrapping FRP or a fiber material around an outer circumferential surface of the liner at room temperature. Even when the number of reinforcement layers disposed on the outer circumferential surface of the liner is increased, the thickness and the volume of the gas cylinder increase.

Also, a method for manufacturing gas cylinders according to the related art has a considerable defect rate and lowered productivity caused by the defect rate, and efforts for improving a manufacturing process have been continuously made so as to solve the problems.
  (Patent document 1) KR10-1999-0085513 A1
  (Patent document 2) KR10-2007-0099688 A1
  (Patent document 3) KR10-0746248 B1
  (Patent document 4) KR10-2010-0090732 A1

DISCLOSURE

Technical Problem

The present invention is directed to providing a method for manufacturing gas cylinders, whereby gas cylinders having reliability and improved strength can be produced and a defect rate is reduced so that an improvement in productivity can be expected.

Technical Solution

One aspect of the present invention provides a method for manufacturing gas cylinders, the method includes: a) producing a liner using a liner blower machine; b) applying an adhesive to a thread of the produced liner; c) coupling a bushing to the thread of the liner; d) maintaining the liner having undergone c) at room temperature for 30 minutes to 2 hours so as to naturally harden the adhesive; e) performing a liner-flaming by a heat-treating an outer surface of the liner with plasma; f) coupling a shaft to the liner; g) mixing multiple fiberglass strands with a resin and a hardening agent, and winding the mixture around the outer surface of the liner; h) dry-hardening the cylinder made of the composite material undergone the winding for 70 to 90 minutes at a temperature of 70 to 90; i) cooling by maintaining the cylinder made of the composite material at room temperature for 15 to 40 minutes so as to lower the surface temperature of the cylinder having undergone the dry-hardening to a level of 35 or lower; j) separating the shaft from the cylinder made of the composite material; k) assembling a valve onto the bushing installed in the cylinder made of the composite material; and l) checking the state of the gas cylinder including the cylinder made of the composite material.

a) may include: manufacturing a liner using the liner blower machine; extracting the liner from the liner blower machine using a liner extracting robot; removing scraps on a surface of the liner; maintaining the liner at room temperature for 4 to 6 hours and curing the liner; and checking dimensions of the liner.

l) may include: performing a pressure resistance test by maintaining the cylinder made of the composite material for a predetermined time under pressure between 2 Mpa and 4 Mpa and checking the pressure resistance of the cylinder made of the composite material; and performing an airtightness test by maintaining the gas cylinder under pressure between 1 Mpa and 2 Mpa, placing the gas cylinder into a water tub filled with soapy bubbles and then checking the airtightness of the gas cylinder.

Advantageous Effects

As described above, in a method for fabricating gas cylinders according to the present invention, after undergoing a liner-flaming step, a cylinder made of a composite material is produced by winding a heterogeneous material in which a resin and a hardening agent are mixed with fiberglass, and drying and cooling steps are undergone so that the strength of gas cylinders can be remarkably improved compared to gas cylinders according to the related art.

In addition, in the method for manufacturing gas cylinders according to the present invention, after a bushing is coupled using an adhesive, a valve is fixed to an inside of the bushing so that airtightness is improved, a defect rate is remarkably reduced by undergoing a pressure resistance test and an airtightness test together with visual inspection and thus overall productivity is improved.

MODES OF THE INVENTION

Figure 1:
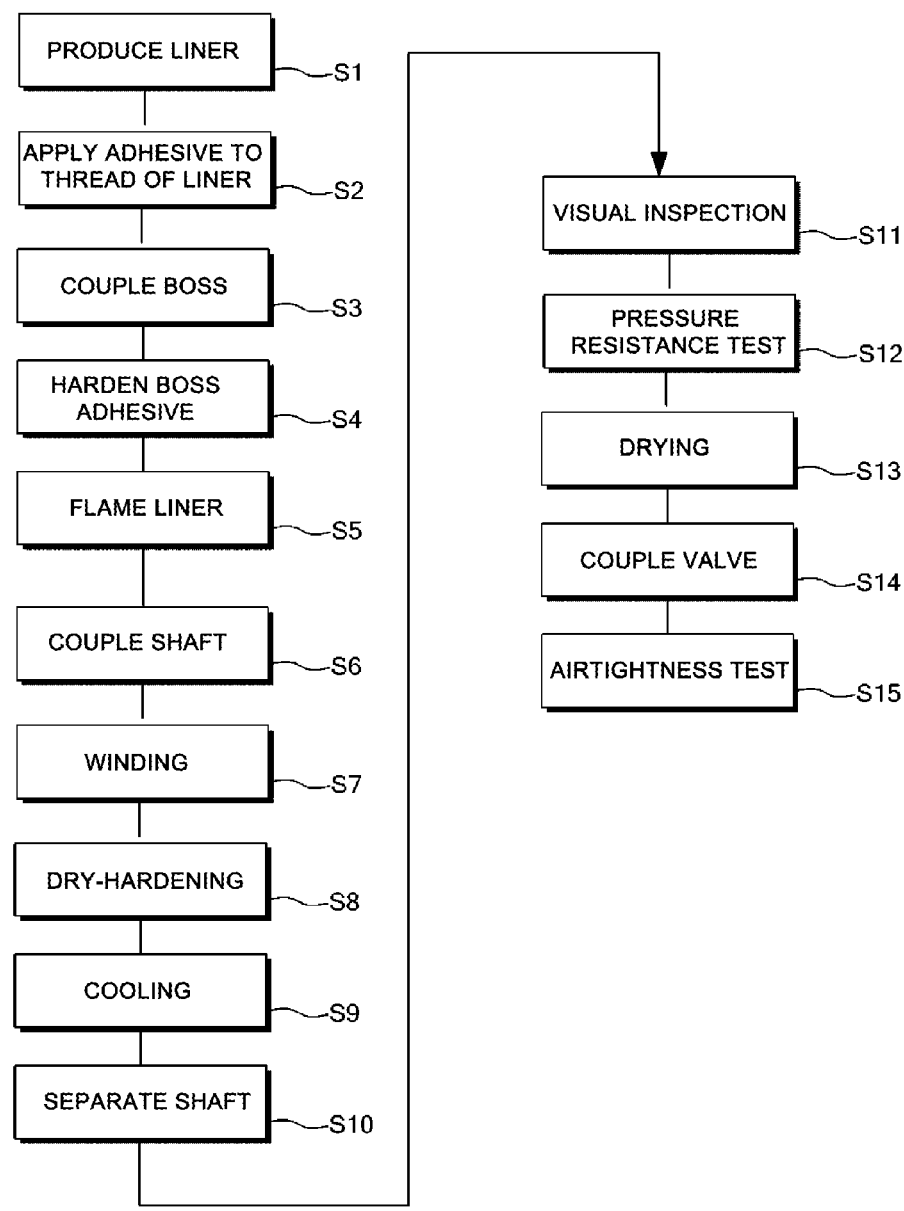
FIG. 1 is a block diagram illustrating a manufacturing step for describing a method for manufacturing gas cylinders according to an embodiment of the present invention.

Hereinafter, exemplary embodiments of the present invention will be described in detail.

However, the present invention is not limited to the exemplary embodiments disclosed below, but can be implemented in various forms. The following exemplary embodiments are described in order to enable those of ordinary skill in the art to embody and practice the invention.

While describing the drawings, like reference numerals are used for like elements.

It will be understood that, although the terms "first," "second," etc. may be used herein to describe various elements, these elements should not be limited by these terms. These terms are only used to distinguish one element from another.

For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element or intervening elements may be present.

In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, exemplary embodiments of the present invention will be described in detail with reference to the attached drawings.

Figure 2:
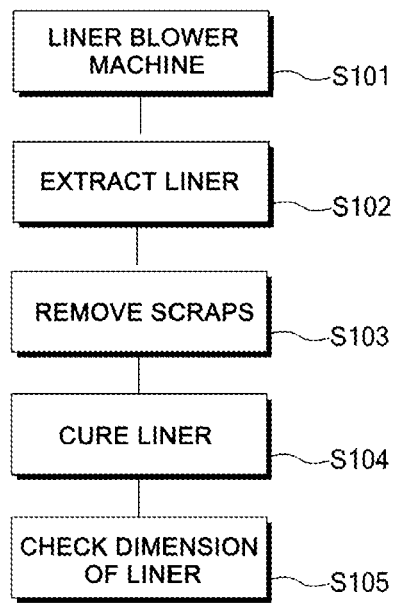
FIG. 2 is a block diagram illustrating a step of producing a liner illustrated in FIG. 1 according to steps.
Figure 3:
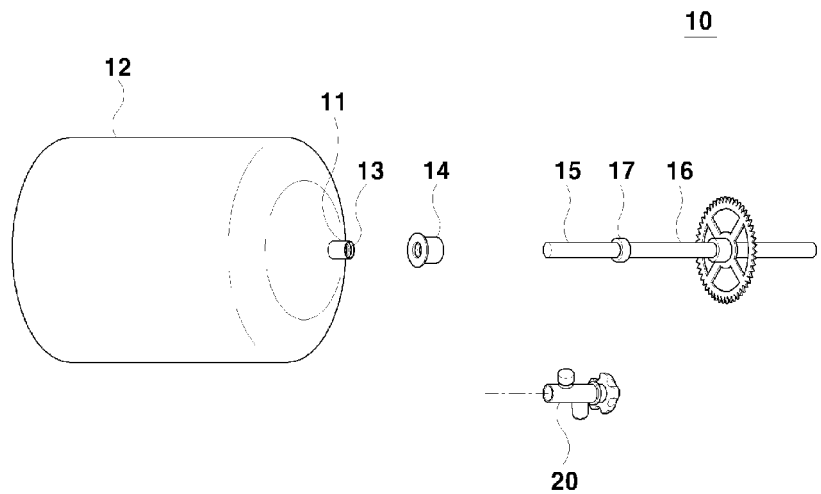
FIG. 3 is an exploded perspective view of a gas cylinder for describing components coupled to a cylinder made of a composite material.

FIG. 1 is a block diagram illustrating a manufacturing step for describing a method for manufacturing gas cylinders according to an embodiment of the present invention, and FIG. 2 is a block diagram illustrating a step of producing a liner illustrated in FIG. 1 according to steps, and FIG. 3 is an exploded perspective view of a gas cylinder 10 for describing components coupled to a cylinder made of a composite material.

Referring to FIGS. 1 through 3, the method for manufacturing gas cylinders according to an embodiment of the present invention will be described below.

The present invention is characterized by the method for manufacturing gas cylinders and does not relate to a transportation unit, such as a conveyor for moving according to steps, or an apparatus for manufacturing gas cylinders. Thus, a detailed description of the transportation unit or the apparatus for manufacturing gas cylinders will be omitted.

First, a liner (not shown) is produced using a liner blower machine (not shown) (S1). The liner has the same shape as a cylinder 12 made of a composite material of FIG. 3. However, in the present specification, the liner is a cylinder before undergoing a winding step S7 that will be described below, and the cylinder having undergone the winding step S7 is referred to as the cylinder 12 made of the composite material. The liner and the liner blower machine are well-known technology and thus, a detailed description thereof will be omitted. Also, the reference numeral 12 of FIG. 3 is the cylinder made of the composite material having undergone winding step S7. However, the shape of the liner is the same as that of the cylinder made of the composite material. Thus, hereinafter, even when describing the liner, for convenience of explanation, the liner will be described by referring to the cylinder 12 made of the composite material. The liner and the cylinder 12 made of the composite material each have an inlet 11 formed at an end of one side of the liner and the cylinder 12 made of the composite material and thread 13 formed at an inside of the inlet 11, as illustrated in FIG. 3.

The liner-producing step will be described in detail with reference to FIG. 2. When the liner is produced using the liner blower machine (S101), the liner is extracted from the liner blower machine to the outside using a liner extracting robot (not shown) (S102).

After the liner extracted to the outside is transported by a conveyor, a process of removing marks or scraps on an outer surface of the liner is undergone (S103). The scrap-removing process may be manually performed, or the scraps may be removed using a scrap removing device. The liner from which scraps are removed, is moved to a liner curing place again using the conveyor. Here, the liner is left for 4 to 6 hours at room temperature. The liner manufactured of a resin while remaining for a predetermined time at room temperature is dried and is solidly cured (S104).

Dimensions of the liner having undergone the curing step are checked. That is, a full length and an outer diameter of the liner are measured and are input to a computer (S105).

Next, by referring to the shape of the cylinder 12 made of the composite material of FIG. 3 formed at an inlet of the liner, an adhesive is applied to the thread 13 (S2), and a bushing 14 is coupled to the thread 13 to which the adhesive is applied (S3). The bushing 14 is combined with a shaft 16 when the shaft 16 is coupled later, and after the shaft 16 is removed, the bushing 14 is combined with a valve 20 that finally provides a gas charging and discharging port and solidly fixes the valve. The liner to which the bushing 14 is coupled, is left for 30 minutes to 2 hours at room temperature. In this case, the adhesive through which the bushing 14 and the liner thread 13 are coupled to each other, is naturally hardened (S4).

Next, a liner-flaming step of heat-treating an outer surface of the liner with plasma is undergone (S5). Fiberglass is wound around the outer surface of the liner so as to reinforce the strength thereof. To this end, the outer surface of the liner 12 is heat-treated using oxygen plasma. When the outer surface of the liner is heat-treated using oxygen plasma, oxygen radicals, atoms, or molecules of high energy are radiated onto a surface of the liner made of the resin, and the outer surface of the liner is activated and is electrically charged. Thus, the liner is in an activated state in which the liner may be strongly combined with the fiberglass in a winding step (S7) that will be described below.

Next, the shaft 16 is coupled to the liner (S6). The shaft 16 is temporarily coupled to the bushing 14 at the inlet of the liner and serves as a jig during a winding process and a hardening process in a drying furnace that will be described below. The shaft 16 is coupled to the liner so that a bearing 17 fixed to a shaft axis 15 may be engaged with an inside of the bushing 14.

Next, after a plurality of fiberglass strands are mixed with the resin and a hardening agent, the mixed fiberglass is wrapped on the outer surface of the liner (S7). The surface of the liner heat-treated with plasma is easily combined with the fiberglass mixed with the hardening agent and the resin and is integrated with the fiberglass. The cylinder having reinforced strength is referred to as the cylinder 12 made of the composite material. By undergoing the winding step, the cylinder 12 made of the composite material is manufactured. The cylinder 12 made of the composite material has the same exterior as that of the liner made of a raw material but has sufficient strength at which the liner can withstand a pressure resistance of the high-pressure gas, unlike the liner.

Next, the cylinder 12 made of the composite material having undergone the winding step of the fiberglass is moved to the drying furnace using a moving unit combined with the shaft 16. The drying furnace (not shown) is maintained at predetermined temperature within the range of 70° C. to 90° C. using an indirect heating method using a heater and a fan. The moving unit repeatedly performs transportation and return to the inside of the drying furnace and dries the cylinder 12 made of the composite material for 70 to 90 minutes. Also, the moving unit repeatedly performs transportation and return while rotating the cylinder 12 made of the composite material so that the fiberglass and the resin wrapped on the outer surface of the cylinder 12 made of the composite material may not lean toward one side.

Next, the cylinder 12 made of the composite material undergoes a cooling step for 15 to 40 minutes at room temperature (S9). The cooling step is performed so as to lower the surface temperature of the dried cylinder 12 made of the composite material to a level of 35° C. or lower. In the cooling step, the cylinder 12 made of the composite material is left for 15 to 40 minutes at room temperature.

Next, the shaft 16 is separated from the cylinder 12 made of the composite material (S10). The separate shaft 16 is moved to a place for the above-described shaft coupling process using the conveyor and then is used again.

Next, the cylinder 12 made of the composite material undergoes a visual inspection, a pressure resistance test, and a drying step (S11, S12, and S13). The visual inspection checks whether the cylinder 12 made of the composite material is defective with an inspector's naked eye. In the pressure resistance test, after the cylinder 12 made of the composite material is maintained under a predetermined pressure between 2 Mpa and 4 Mpa, it is then dropped into a water tub and maintained for a predetermined time. The pressure resistance test checks whether the cylinder 12 made of the composite material can withstand the pressure between 2 Mpa and 4 Mpa, and when the cylinder 12 made of the composite material cannot withstand the internal pressure, water drops are formed in the water tub. When the pressure is less than 2 Mpa, the pressure of the cylinder 12 made of the composite material is low, and there is no reason for the pressure resistance test to be performed. When the pressure is equal to or greater than 4 Mpa, the pressure of the cylinder 12 made of the composite material is too high and the gas cylinder may be damaged. Thus, it is important to perform the pressure resistance test with the pressure in this range.

Then, the valve 20 is assembled onto the bushing 14 installed in the cylinder 12 made of the composite material (S14). Referring to FIG. 4, a structure in which the bushing 14, the shaft 16 and the valve 20 are coupled to the cylinder 12 made of the composite material, may be known. The valve 20 serves as an inlet and an outlet for charging gas inside the gas cylinder or discharging gas.

After the valve 20 is assembled, the cylinder 12 made of the composite material is maintained under a predetermined pressure between 1 Mpa and 2 Mpa and then, a gas cylinder 10 having the assembled valve 20 is placed into a water tub filled with soapy bubbles so that an airtightness test of the gas cylinder 10 can be performed (S15). In the airtightness test, the pressure of the cylinder 12 made of the composite material does not need to be increased, unlike in the pressure resistance test, and pressure required for the airtightness test is sufficient between 1 Mpa and 2 Mpa. For the airtightness test, after the gas cylinder 10 is immersed into the water tub filled with soapy bubbles, it is checked whether bubbles are generated in the gas cylinder 10. The gas cylinder 10 refers to a state in which the bushing 14 and the valve 20 are coupled to the cylinder 12 made of the composite material having undergone the winding step.

While the invention has been shown and described with reference to certain exemplary embodiments thereof, it will be understood by those skilled in the art that various changes in form and details may be made therein without departing from the spirit and scope of the invention as defined by the appended claims.

INDUSTRIAL APPLICABILITY

The present invention can be widely used in the industry for manufacturing gas cylinders.

The invention claimed is:
1. A method for manufacturing gas cylinders comprises:
a) manufacturing a liner, comprising
  forming the liner into a cylinder using a liner blower machine;
  extracting the liner from the liner blower machine using a liner extracting robot;
  removing scraps on a surface of the liner;
  maintaining the liner at room temperature for 4 to 6 hours and curing the liner; and
  checking dimensions of the liner;
b) applying an adhesive to a thread of the liner;
c) coupling a bushing to the thread of the liner;
d) maintaining the liner having undergone c) at room temperature for 30 minutes to 2 hours so as to naturally harden the adhesive;
e) performing a liner-flaming by a heat-treating an outer surface of the liner with plasma;
f) coupling a shaft to the liner;
g) mixing multiple fiberglass strands with a resin and a hardening agent, and winding the mixture around the outer surface of the liner to form the gas cylinder;
h) dry-hardening the gas cylinder made of the composite material undergone the winding for 70 to 90 minutes at a temperature of 70° C. to 90° C.;
i) cooling by maintaining the gas cylinder made of the composite material at room temperature for 15 to 40 minutes so as to lower the surface temperature of the gas cylinder having undergone the dry-hardening to a level of 35° C. or lower;
j) separating the shaft from the gas cylinder made of the composite material;
k) assembling a valve onto the bushing installed in the gas cylinder made of the composite material; and
l) checking the state of the gas cylinder including the gas cylinder made of the composite material, comprising performing a pressure resistance test by maintaining the gas cylinder made of the composite material for a predetermined time under pressure between 2 Mpa and 4 Mpa and checking the pressure resistance of the gas cylinder made of the composite material; and performing an airtightness test by maintaining the gas cylinder under pressure between 1 Mpa and 2 Mpa, placing the gas cylinder into a water tub filled with soapy bubbles, and then checking the airtightness of the gas cylinder.

* * * * *